(12) United States Patent
Gunasekara et al.

(10) Patent No.: US 8,428,511 B1
(45) Date of Patent: Apr. 23, 2013

(54) SYSTEM AND METHOD FOR A HIGH AVAILABLE AND SURVIVABLE COMMUNICATION SYSTEM

(75) Inventors: Don Gunasekara, Reston, VA (US); Tom Wilson, Overland Park, KS (US)

(73) Assignee: Nextel Communications Inc., Reston, VA (US)

( * ) Notice: Subject to any disclaimer, the term of this patent is extended or adjusted under 35 U.S.C. 154(b) by 1586 days.

(21) Appl. No.: 11/837,348

(22) Filed: Aug. 10, 2007

(51) Int. Cl.
*H04B 13/02* (2006.01)

(52) U.S. Cl.
USPC .............. 455/40; 455/11.1; 455/39; 455/402; 455/14; 455/414.1; 455/414.2; 455/422.1; 455/423; 455/3.06; 455/445; 455/426.2; 455/560; 455/13.1; 370/420; 370/463; 370/475; 370/353; 370/401; 370/349; 375/258; 375/211; 340/12.32; 340/531

(58) Field of Classification Search . 307/3; 340/310.11, 340/538, 538.11, 870.01, 3.1, 310.17, 531; 370/351, 420, 353, 401, 349; 375/258, 220; 455/414.1, 423, 426.2, 445, 3.06
See application file for complete search history.

(56) References Cited

U.S. PATENT DOCUMENTS

| | | | |
|---|---|---|---|
| 3,490,022 A | 1/1970 | Eisenberg et al. | |
| 5,668,562 A | 9/1997 | Cutrer et al. | |
| 5,982,333 A | 11/1999 | Stillinger et al. | |
| 6,885,674 B2 * | 4/2005 | Hunt et al. | 370/420 |
| 6,980,772 B1 | 12/2005 | Underbrink et al. | |
| 7,043,195 B2 * | 5/2006 | Bunton et al. | 455/11.1 |
| 7,072,698 B2 | 7/2006 | Underbrink et al. | |
| 7,181,204 B2 * | 2/2007 | Alfano et al. | 455/423 |
| 7,224,272 B2 * | 5/2007 | White et al. | 370/419 |
| 7,321,291 B2 * | 1/2008 | Gidge et al. | 375/258 |
| 7,382,232 B2 * | 6/2008 | Gidge et al. | 340/12.32 |
| 7,450,000 B2 * | 11/2008 | Gidge et al. | 340/538 |
| 7,450,001 B2 * | 11/2008 | Berkman | 370/463 |
| 7,515,874 B2 | 4/2009 | Nikolajevic et al. | |
| 7,747,244 B2 * | 6/2010 | Alfano et al. | 455/414.1 |
| 7,764,943 B2 * | 7/2010 | Radtke | 455/402 |
| 7,796,025 B2 * | 9/2010 | Berkman | 340/538.16 |
| 2003/0109231 A1 | 6/2003 | Marcus et al. | |
| 2003/0181163 A1 | 9/2003 | Ofuji et al. | |
| 2003/0224784 A1 * | 12/2003 | Hunt et al. | 455/426.2 |
| 2004/0102219 A1 * | 5/2004 | Bunton et al. | 455/560 |
| 2005/0075070 A1 | 4/2005 | Crilly | |
| 2005/0168326 A1 * | 8/2005 | White et al. | 340/310.01 |
| 2006/0052059 A1 | 3/2006 | Hyslop | |
| 2006/0097573 A1 * | 5/2006 | Gidge et al. | 307/3 |
| 2006/0232468 A1 | 10/2006 | Parker et al. | |
| 2007/0135042 A1 | 6/2007 | Shiff | |
| 2008/0070575 A1 | 3/2008 | Claussen et al. | |
| 2009/0054064 A1 | 2/2009 | Chuang | |
| 2009/0156118 A1 | 6/2009 | Schadler | |
| 2009/0233602 A1 | 9/2009 | Hughes | |

* cited by examiner

*Primary Examiner* — April G Gonzales

(57) ABSTRACT

A network architecture for underground communication using redundant interconnected communication systems utilizes an aboveground master control station to send a status request message to a belowground gateway. The gateway may then, in turn, broadcast a status request message to a plurality of communication hubs located throughout an underground region using each of a plurality of potentially available communication systems. In the event that one of the communication hubs fails to respond over the then-current communication system, the master control station may switch the current communication system being used to a truly available system.

20 Claims, 3 Drawing Sheets

SYSTEM AND METHOD FOR A HIGH AVAILABLE AND SURVIVABLE COMMUNICATION SYSTEM

FIELD OF THE INVENTION

The present invention relates generally to communication systems, and more particularly to providing a high available and survivable communication (HASC) system for particular use in underground applications.

BACKGROUND OF THE INVENTION

There are a variety of situations which require below-ground communications. For example, miners in a coal mine or utility workers in a utility tunnel may require the ability to communicate with each other, as well with aboveground personnel. Another situation would be in the context of underground transportation, such as subways.

Given the potential danger involved in such underground situations, reliable channels of communications with aboveground personnel is particularly important. The current approach to provide communication to such underground areas is the use of a so-called leaky coax cable. Leaky coax cable systems consist of a cable run along predefined belowground area which emits and receives radio waves. Leaky coax cable systems have a limited range due to the high radio frequencies used. Such high frequency transmissions do not readily penetrate solid rock, which limits such systems to essentially being line-of-sight communication systems.

In emergency situations, such as an explosion or cave in, communication systems, such as leaky coax cable systems, are susceptible to being damaged. In addition, such hardwired systems are particularly susceptible to being run over by the heavy equipment moving in and out of mines. This can be a life threatening situation, preventing those underground from being directed to a safe exit or located for rescue.

Solutions have been demonstrated for establishing wireless, 2-way communications through earth and rock, such as the systems disclosed and claimed in co-pending U.S. patent application Ser. Nos. 11/773,847 and 11/773,814, which are hereby fully incorporated by reference. However, such systems may also be susceptible to malfunction, interference or otherwise being compromised.

As such, there has been an increased interest in providing a redundant HASC communication solution, specifically for underground communication applications, which provides reliable communication during both normal operation, as well as during emergency situations or network outages.

SUMMARY OF THE INVENTION

Disclosed and claimed herein are systems and methods for providing redundant underground communications. In one embodiment, a method includes receiving a status request message from an aboveground control unit, broadcasting the status request message to a plurality of belowground communication hubs over a plurality of communication systems, and detecting that a current communication system is unavailable for a communication hub of the plurality of belowground communication hubs. The method further includes transmitting a switch over command to the communication hub to use an available communication system of the plurality of communication systems, and receiving, in response to the switch over command, a switch over response from the communication hub over the available communication system. In addition, the method includes designating the available communication system as an active communication system for the communication hub in response to receiving the switch over response.

Other aspects, features, and techniques of the invention will be apparent to one skilled in the relevant art in view of the following description of the exemplary embodiments of the invention.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE EXEMPLARY EMBODIMENTS

Figure 1:
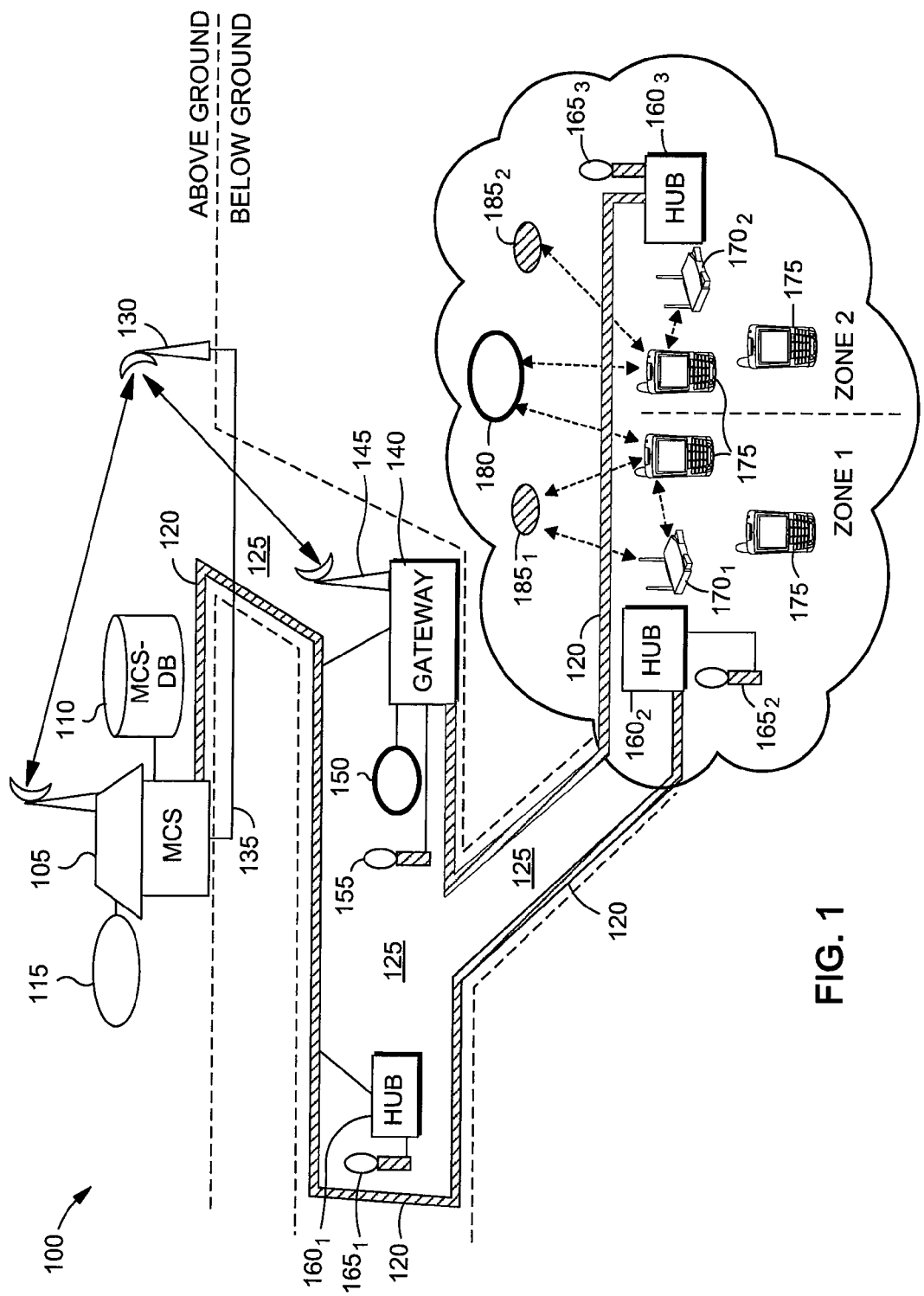
FIG. 1 is a block diagram illustrating of a high available and survivable communication (HASC) system configured in accordance with one embodiment of the invention.

One aspect of the invention relates to providing a network architecture for underground communication using redundant interconnected communication systems. In one embodiment, an aboveground master control station sends a status request message to a belowground gateway which, in turn, broadcasts a message to a plurality of communication hubs located throughout an underground region using each of a plurality of potentially available communication systems.

In the event that one of the communication hubs fails to respond over the then-current communication system, the master control station may switch the current communication system being used to a truly available system. As will be described below in detail with reference to FIGS. 1-3, a series of signals may be exchanged between the master control station, the gateway and the hubs to detect defective or faulty communication systems, and to ensure that the current communication system is fully functional.

As used herein, the terms "a" or "an" shall mean one or more than one. The term "plurality" shall mean two or more than two. The term "another" is defined as a second or more. The terms "including" and/or "having" are open ended (e.g., comprising). The term "or" as used herein is to be interpreted as inclusive or meaning any one or any combination. Therefore, "A, B or C" means "any of the following: A; B; C; A and B; A and C; B and C; A, B and C". An exception to this definition will occur only when a combination of elements, functions, steps or acts are in some way inherently mutually exclusive.

Reference throughout this document to "one embodiment", "certain embodiments", "an embodiment" or similar term means that a particular feature, structure, or characteristic described in connection with the embodiment is included in at least one embodiment of the present invention. Thus, the appearances of such phrases or in various places throughout this specification are not necessarily all referring to the same embodiment. Furthermore, the particular features, structures, or characteristics may be combined in any suitable manner on one or more embodiments without limitation.

In accordance with the practices of persons skilled in the art of computer programming, the invention is described below with reference to operations that are performed by a computer system or a like electronic system. Such operations are sometimes referred to as being computer-executed. It will be appreciated that operations that are symbolically represented include the manipulation by a processor, such as a central processing unit, of electrical signals representing data bits and the maintenance of data bits at memory locations, such as in system memory, as well as other processing of signals. The memory locations where data bits are maintained are physical locations that have particular electrical, magnetic, optical, or organic properties corresponding to the data bits.

When implemented in software, the elements of the invention are essentially the code segments to perform the necessary tasks. The code segments can be stored in a processor readable medium or transmitted by a computer data signal. The "processor readable medium" may include any medium that can store or transfer information. Examples of the processor readable medium include an electronic circuit, a semiconductor memory device, a ROM, a flash memory or other non-volatile memory, a floppy diskette, a CD-ROM, an optical disk, a hard disk, a fiber optic medium, a radio frequency (RF) link, etc. References to "modules" refers to software, hardware or any combination thereof.

Exemplary Embodiments

FIG. 1 illustrates a network architecture 100 for underground communication using redundant interconnected communication systems, such as a VLF system, Ethernet, Wi-Fi, a cellular communication system, a leaky feeder cable system, etc. In particular, network architecture 100 includes a master control station (MCS) 105 situated at an aboveground location. The MCS 105 includes a database 110 for storing information regarding current and available communication systems, as will be described in more detail below. The MCS 105 may also be connected to a leaky coax cable 120, which runs into and throughout an underground region 125 with which (and within which) communication is desired.

Additionally, the MCS 105 is shown as including a horizontal type loop antenna 115, which in one embodiment may be a ferrite-loaded loop antenna. In other embodiments, the antenna may be configured as a conventional whip antenna, an active whip antenna, a conventional loop antenna, multi-turn loop antenna, or any other antenna consistent with the principles of the invention. Regardless of configuration, the antenna 115 may be designed to send and receive very low frequency (VLF) radio frequency (RF) signals in the range of 3 to 30 kHz. However, the antenna 115 may be similarly designed to operate at lower frequencies (e.g., extremely low, super low and ultra-low frequencies), as well as at higher frequencies (e.g., low, medium, high, very high frequencies, etc.). In certain embodiments, such RF signals (e.g., VLF signals) from antenna 115, are able to penetrate through hundreds of meters of sold rock.

The MCS 105 is also configured to communicate with a public cellular communication system, which utilizes one or more aboveground base stations 130, as is known in the field of cellular communications. The MCS 105 may also be hardwired to the public cellular communication system, as shown by line 135.

The network architecture 100 further includes a communication gateway 140 configured to communicate with base station 130 using antenna 145. Gateway 140 may function as a communication gateway through which separate communication systems may be monitored by the MCS 105. The gateway 140 may be configured to receive and transmit using a plurality of different communication protocols or systems (e.g., VLF, Ethernet, Wi-Fi, cellular, leaky feeder cable, etc.). To that end, the gateway 140 is depicted as including a VLF horizontal antenna 150, as well as vertical antenna 155. In certain embodiment, vertical antenna 155 may also be used for VLF communications, or alternatively may be used for RF communications between 3 kHz and 30 kHz. It should of course be appreciated that the gateway may have more or less communication options than those shown in FIG. 1 depending, for example, on the amount of communication redundancy desired.

One function of the gateway 140 is to detect when a particular communication system, or portion thereof, is otherwise unavailable and report this information to the MCS 105. In certain embodiments, the MCS 105 may instruct the gateway 140 to switch the current communication system being used to an available communication system. To do so, gateway 140 may be configured with logic for switching from a current communication system to a new active system. Such switching logic may be hardware, software or a combination thereof. In one embodiment, gateway 140 may include a memory/database (not shown) for storing information relating to, for example, which communication systems are available or not.

Below the gateway 140 in the underground region 125, the network architecture 100 is further comprised of a plurality of communication hubs $160_1$-$160_3$ which may be located throughout underground region 125. In one embodiment, the gateway 140 is configured to communicate not only with the MCS 105, but also with each of the communication hubs $160_1$-$160_3$ via one or more of the available communication systems. As shown, each communication hub $160_1$-$160_3$ is configured with at least one antenna $165_1$-$165_3$ and is electrically connected to the leaky feeder cable system 120. In certain embodiments, antennas $165_1$-$165_3$ may be use for VLF communications. Additionally, some communication hubs (e.g., hubs $160_2$ and $160_3$) are depicted as including Wi-Fi components $170_1$-$170_2$. In this fashion, reliable communication may be provided to a plurality of belowground personnel, such as to the users of devices 175.

In addition to the plurality of communication hubs $160_1$-$160_3$, fixed antenna loops, such as antenna loop 180, may be affixed throughout the underground region 125. Moreover, a radio frequency identification system, or RFID system, may be used to provide location information for the various user devices 175. In one embodiment, the RFID system is comprised of a plurality of RFID readers $185_1$-$185_2$ positioned at various locations in the underground region 125. The RFID readers $185_1$-$185_2$ include transceivers which emit a continuous interrogatory signal having a limited range. A user device 175 equipped with an RFID tag located in the vicinity will detect this interrogatory signal and emit certain identifying data in response. Upon receiving and decoding this identifying data, the RFID readers $185_1$-$185_2$ can collect information regarding the approximate locations of the various known user device devices 175. While not depicted as such, it should be appreciated that the RFID readers $185_1$-$185_2$, as well as the fixed antenna loop 180, may be connected to (or otherwise in communication with) one or more of the communication hubs $160_1$-$160_3$ using any of the available communication systems, including a dedicated communication link.

In another embodiment, hubs $160_2$-$160_3$ may use one or more of the available communication systems (e.g., antennas $165_2$-$165_3$, Wi-Fi $170_1$-$170_2$, antenna loop 180, RFID readers $185_1$-$185_2$, etc.) to determine the zone (e.g., zone 1, zone 2, etc.) in which a given user device 175 is located. In this fashion, an architecture of redundant communications systems is provided for communication between an aboveground station and belowground personnel, as well as between personnel located in different belowground regions.

Figure 2:
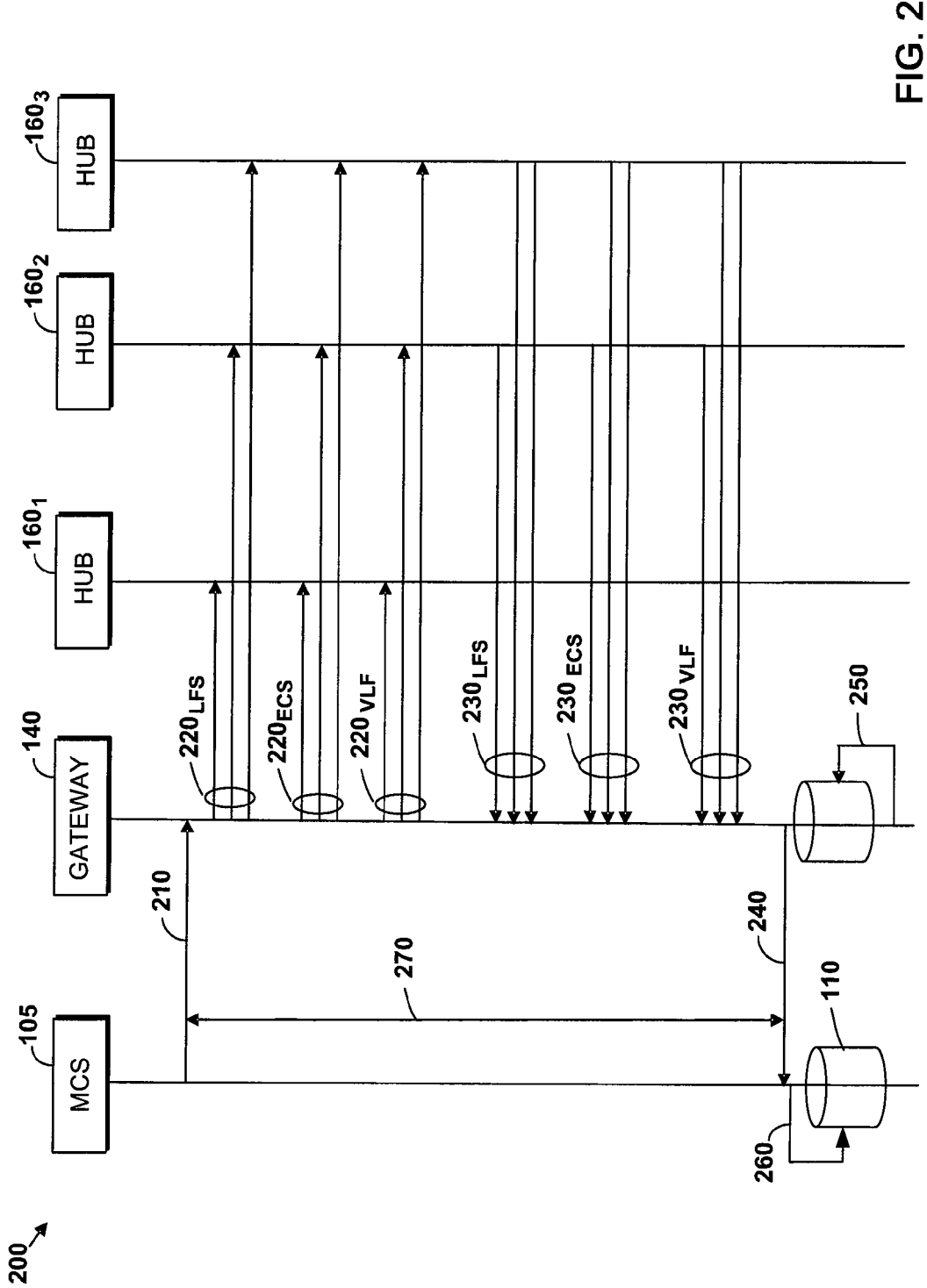
FIG. 2 is one embodiment of a signal flow diagram for carrying one or more aspects of the invention using the HASC system of FIG. 1.

Referring now to FIG. 2, depicted is a signal flow diagram 200 for implementing one embodiment of the invention. The signal flows of FIG. 2 begin when the MCS 105 sends a status request message 210 to the gateway 140. It should be appreciated that the MCS 105 may send out the status request message 210 on a regular interval (e.g., every 1 minute), or at user-selected times.

In any case, the gateway 140 may then broadcast the status request message to hubs $160_1$-$160_3$ over each of the potentially available communication systems, where signal $220_{LFS}$ corresponds to sending the status request message over the leaky feeder system (LFS), signal $220_{ECS}$ corresponds to sending the status request message over the Ethernet cable system (ECS) and signal $220_{VLF}$ corresponds to sending the status request message over the very low frequency (VLF) system. While only the LFS, ECS and VLF communication systems are described, this is done for illustrative purposes only. It should equally be appreciated that additional types of communication systems may be included, or that one or more of the included systems may be omitted. Additionally, the status request message sent by the gateway 140 as signals $220_{LFS}$, $220_{ECS}$ and $220_{VLF}$ may be status request message 210, or may be a separate message that is representative of or corresponds to the status request message 210.

In response to signals $220_{LFS}$, $220_{ECS}$ and $220_{VLF}$ from the gateway 140, the hubs $160_1$-$160_3$ may be configured to respond over each of the available communication systems. To that end, hubs $160_1$-$160_3$ may transmit to the gateway 140 response signals $230_{LFS}$, $230_{ECS}$ and $230_{VLF}$, where each such response signal is sent over the various available communication systems. Based on these response signals, gateway 140 may relay response information 240 to the MCS 105, where the response information 240 is representative of which hubs responded over which of the available communication systems (i.e., LFS, ECS, VLF). This response information 240 may also be stored by the gateway 140 in a local database via data signal 250.

Once the MCS 105 receives the response information 240, a determination may be made as to whether the current or active communication system being used by the hubs $160_1$-$160_3$ needs to be changed. In one embodiment, this determination may be based on detecting that one or more of the hubs $160_1$-$160_3$ failed to respond to the status request message 210 over which ever of the communication systems is the currently active system (e.g., leaky feeder system) within a predetermined period of time. In certain embodiments, a failed response may be determined when the actual response time 270 is greater than a predetermined threshold. As will be described in more detail below with reference to FIG. 3, if the MCS 105 determines that the current communication system should be changed, it may provide an additional signal directing the gateway 140 to designate one of the available communication systems to be the new active system.

In the embodiment of FIG. 2, however, all hubs properly responded over all communication systems to the original status request message 210. Thus, no change may be made to the communication system currently being used by the hubs $160_1$-$160_3$. It should further be appreciated that the MCS 105 may store the response information in its database 110, via data signal 260, in order to maintain a log of the responsiveness of hubs $160_1$-$160_3$.

It is possible that in some embodiments the response signals $230_{LFS}$, $230_{ECS}$ and $230_{VLF}$ may indicate that one of the hubs $160_1$-$160_3$ failed to respond to the broadcast status request message (i.e., signals $220_{LFS}$, $220_{ECS}$ and $220_{VLF}$) over a communication system which may not have been the current communication system. While no change may be made to the current communication system in such cases, this information may nonetheless be relayed to the MCS 105 as part of the response information 240 so that personnel may be alerted accordingly.

Figure 3:
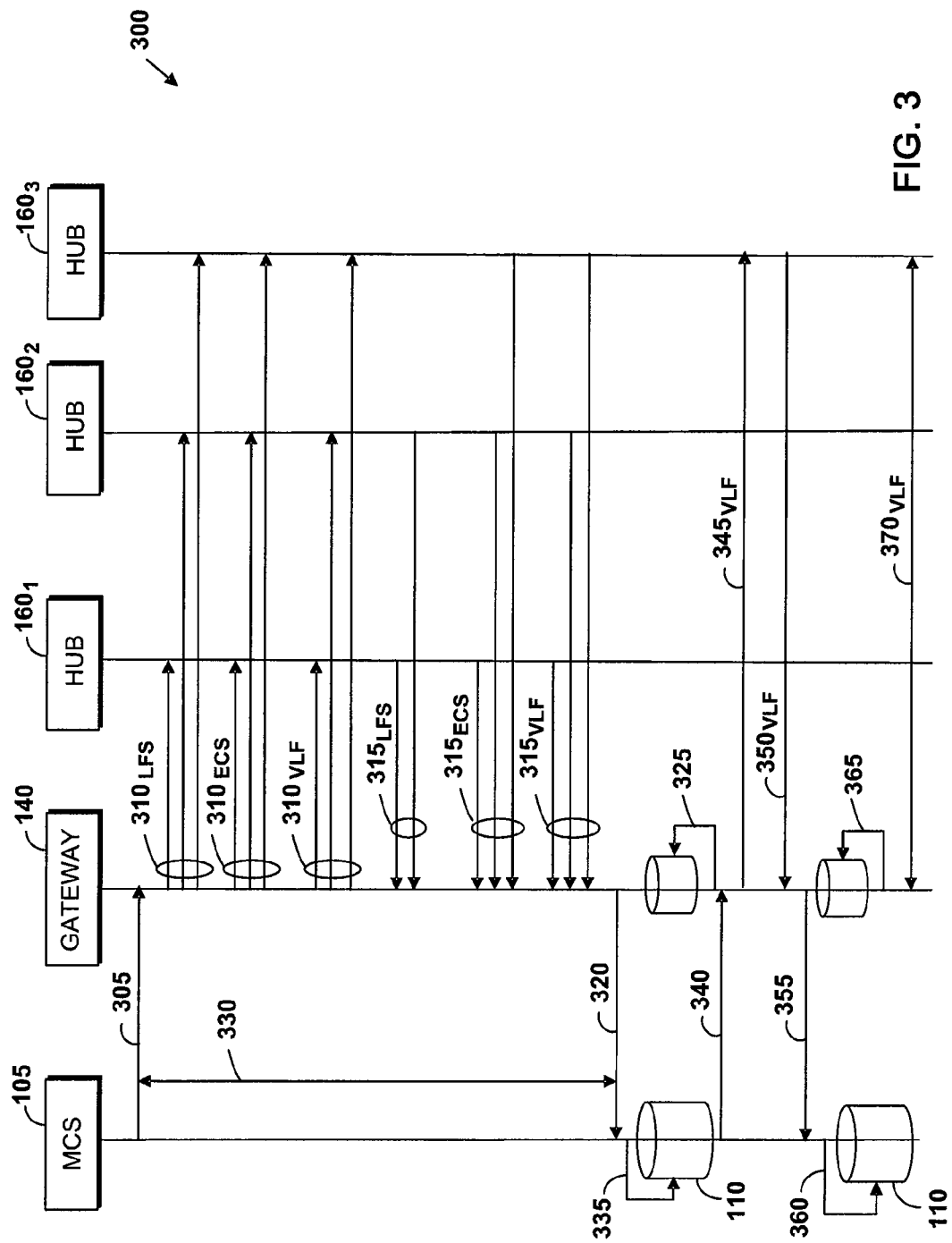
FIG. 3 is another embodiment of a signal flow diagram for carrying one or more aspects of the invention using the HASC system of FIG. 1.

Referring now to FIG. 3, depicted is another embodiment of a signal flow diagram in which one of the hubs has failed to respond to a status request message over all of the available communication systems. In particular, signal flow diagram 300 begins with the MCS 105 sending a status request message 305 to the gateway 140. As with the embodiment of FIG. 2, it should likewise be appreciated that the MCS 105 may send out the status request message on a regular interval or at user-selected times.

Thereafter, the gateway 140 broadcast the status request message to hubs $160_1$-$160_3$ over each of the potentially available communication systems, shown in FIG. 3 as signal $310_{LFS}$ (sent over the leaky feeder system), signal $310_{ECS}$ (sent over the Ethernet cable system), and signal $310_{VLF}$ (sent over the very low frequency system). It should of course be appreciated that additional types of communication systems may be included, or that one or more of the included systems may be omitted.

In response to each of signals $310_{LFS}$, $310_{ECS}$ and $310_{VLF}$, the hubs $160_1$-$160_3$ may be configured to respond over each of the available communication systems. To that end, hubs $160_1$-$160_3$ may transmit back to the gateway 140 response signals $315_{LFS}$, $315_{ECS}$ and $315_{VLF}$, where each such response signal is sent over the various available communication systems. Based on these response signals, gateway 140 may relay response information 320 back to the MCS 105 to inform the MCS 105 which of the hubs $160_1$-$160_3$ responded over which of the available communication systems (i.e., LFS, ECS, VLF). This information may also be stored by the gateway 140 in a local database via data signal 325.

Once the MCS 105 receives the response information 320, a determination may be made as to whether the current or active communication system being used by any of the hubs $160_1$-$160_3$ needs to be changed. In one embodiment, this determination may be based on detecting that one or more of the hubs $160_1$-$160_3$ failed to respond, within a predetermined period of time, to the status request message 305 over which ever of the communication systems is the currently active system. In certain embodiments, this may involve comparing the actual response time 330 to a predetermined threshold. For purposes of illustration, FIG. 3 assumes the current communication system being used by the hubs $160_1$-$160_3$ is the leaky feeder cable system (LFS) RF system implemented, for example, by the leaky feeder cable 120 of FIG. 1. Again, the MCS 105 optionally stores this information in its database 110 via data signal 335.

As shown in the example of FIG. 3, hub $160_3$ failed to respond to the signal $310_{LFS}$. Only hubs $160_1$-$160_2$ responded with signals $315_{LFS}$. Since the failed response involves the current communication system for the hub in question (i.e., hub $160_3$), a change to the current communication system may be desired. To that end, the MCS 105 transmits a switch over request 340 directing the gateway 140 to designate an available communication system to be the new active communication system for hub $160_3$.

In response to receiving the switch over request 340, the gateway 140 may then transmit the switch over command $345_{VLF}$ to hub $160_3$ in order to designate a different, available system to be the current communication system. That is, the switch over request 340 and the switch over command $345_{VLF}$ correspond to the act of switching the communication system that is being used by hub $160_3$ from its current communication system (i.e., LFS) to an available communication system (i.e., VLF), where the availability of such a system can be determined by the fact that a response signal was previously received over it from the hub $160_3$ (e.g., $315_{ECS}$ and $315_{VLF}$). In one embodiment, the various available communication systems may be ranked according to a predetermined order such that the switch over command $345_{VLF}$ may direct that the highest ranked available communication system be designated as the new active communication system for the hub in question. In the embodiment of FIG. 3, the new active communication system is the VLF system.

Continuing to refer to FIG. 3, in response to receiving the switch over command $345_{VLF}$, the hub $160_3$ may issue a switch over response $350_{VLF}$ back to the gateway 140 indicating that it will re-configure to communicate according to the communication system designated in the switch over command $345_{VLF}$, which is the VLF system. In one embodiment, the switch over response $350_{VLF}$ is sent over the new active communication system so as to verify that it is functional.

Upon receiving the switch-over response $350_{VLF}$ over the indicated communication system (i.e., VLF), the gateway 140 may then forward the received switch over response $350_{VLF}$ to the MCS 105 as signal 355. Either or both of the MCS 105 and the gateway 140 may then update their respective databases via signals 360 and 365 to reflect the new active communication system for hub $160_3$. Finally, the gateway 150 and hub $160_3$ may exchange signals $370_{VLF}$ so as to verify the new active communication system—the VLF system—is fully operational. Regardless of the exact criteria used, once the gateway 140 is satisfied that the new active communication system is fully operational, the gateway 140 may designate it as the current and active communication system. In this fashion, an redundant, reliable communication system suitable for belowground application is described.

Another aspect of the invention may be to use the response information 320 to not only switch over to an available system, but also to identify the location or zone where the failure occurred. For example, in the embodiment of FIG. 3, it can be assumed that the failure in the LFS occurred somewhere between hub $160_2$ and hub $160_3$, since hub $160_2$ was able to provide an LFS response while $160_3$ was not. This information may be particularly useful in determining the approximate location of a disaster event, such as a cave in, fire or the like.

While the invention has been described in connection with various embodiments, it should be understood that the invention is capable of further modifications. This application is intended to cover any variations, uses or adaptation of the invention following, in general, the principles of the invention, and including such departures from the present disclosure as come within the known and customary practice within the art to which the invention pertains.

What is claimed is:

1. A method for providing redundant underground communications comprising the acts of:
   receiving a status request message from an aboveground control unit;
   broadcasting the status request message to a plurality of below ground communication hubs over a plurality of communication systems;
   detecting that a current communication system is unavailable for a communication hub of the plurality of belowground communication hubs;
   transmitting a switch over command to the communication hub to use an available communication system of the plurality of communication systems;
   receiving, in response to the switch over command, a switch over response from the communication hub over the available communication system;
   designating the available communication system as an active communication system for the communication hub in response to receiving the switch over response; and
   receiving a response to the status request message from the plurality of below ground communication hubs over each of the plurality of communication systems that is available.

2. The method of claim 1, wherein detecting comprises detecting that the current communication system is unavailable when a response to the status request message is not received from the communication hub within a predetermined period of time.

3. The method of claim 1, further comprising informing the aboveground control unit that the current communication system is unavailable for the communication hub.

4. The method of claim 3, wherein sending the switch over command comprises sending the switch over command to the communication hub in response to a switch over request received from the aboveground control unit.

5. The method of claim 1, further comprising transmitting a test communication to the active communication system to verify availability.

6. The method of claim 1, wherein the plurality of communication systems includes at least one of a leaky feeder cable system, a very low frequency system, an Ethernet system, a Wi-Fi network, and a cellular communication network.

7. A system for providing redundant underground communications comprising:
   a receiver configured to receive a status request message from an aboveground control unit;
   a transmitter for broadcasting the status request message to a plurality of belowground communication hubs over a plurality of communication systems; and
   a processor electrically connected to the receiver and the transmitter, the processor configured to:
      detect that a current communication system is unavailable for a communication hub of the plurality of below ground communication hubs,
      send, using the transmitter, a switch over command to the communication hub to use an available communication system of the plurality of communication systems,
      receive, in response to the switch over command, a switch over response from the communication hub over the available communication system,
      designate the available communication system as an active communication system for the communication hub in response to the switch over response, and
      receive a response to the status request message from the plurality of below ground communication hubs over each of the plurality of communication systems that is available.

8. The system of claim 7, wherein the processor is configured to detect that the current communication system is unavailable when a response to the status request message is not received from the communication hub within a predetermined period of time.

9. The system of claim 7, wherein the processor is further configured to inform the aboveground control unit that the current communication system is unavailable for the communication hub.

10. The system of claim 9, wherein the processor is configured to send the switch over command to the communication hub in response to a switch over request received from the aboveground control unit.

11. The system of claim 7, wherein the processor is further configured to transmit a test communication to the active communication system to verify availability.

12. The system of claim 8, wherein the plurality of communication systems includes at least one of a leaky feeder cable system, a very low frequency system, an Ethernet system, a Wi-Fi network, and a cellular communication network.

13. The system of claim 8, wherein the processor is further configured to update a status database with information regarding the active communication system.

14. A computer program product, comprising:
a non-transitory processor readable medium having processor executable code embodied therein for providing redundant underground communications, the processor readable medium having:
processor executable program code to receive a status request message from an aboveground control unit;
processor executable program code to broadcast the status request message to a plurality of below ground communication hubs over a plurality of communication systems;
processor executable program code to detect that a current communication system is unavailable for a communication hub of the plurality of below ground communication hubs;
processor executable program code to transmit a switch over command to the communication hub to use an available communication system of the plurality of communication systems;
processor executable program code to receive, in response to the switch over command, a switch over response from the communication hub over the available communication system;
processor executable program code to designate the available communication system as an active communication system for the communication hub in response to receiving the switch over response, and
processor executable program code to receive a response to the status request message from each of the plurality of communication systems that is available.

15. The computer program product of claim 14, wherein the processor executable program code to detect comprises processor executable program code to detect that the current communication system is unavailable when a response to the status request message is not received from the current communication system within a predetermined period of time.

16. The computer program product of claim 14, wherein the processor readable medium further includes processor executable program code to inform the aboveground control unit that the current communication system is unavailable.

17. The computer program product of claim 16, wherein processor executable program code to send the switch over command comprises processor executable program code to send the switch over command to the available communication system in response to a switch over request from the aboveground control unit.

18. The computer program product of claim 14, wherein the processor readable medium further includes processor executable program code to transmit a test communication to the active communication system to verify availability.

19. The computer program product of claim 14, wherein the plurality of communication systems includes at least one of a leaky feeder cable system, a very low frequency system, an Ethernet system, a Wi-Fi network, and a cellular communication network.

20. The computer program product of claim 14, wherein the processor readable medium further includes processor executable program code to update a status database with information regarding the active communication system.

\* \* \* \* \*